United States Patent
Gong et al.

(10) Patent No.: US 10,652,452 B2
(45) Date of Patent: May 12, 2020

(54) METHOD FOR AUTOMATIC FOCUS AND PTZ CAMERA

(71) Applicant: HANGZHOU HIKVISION DIGITAL TECHNOLOGY CO., LTD., Zhejiang (CN)

(72) Inventors: Qi Gong, Zhejiang (CN); Weimin Ma, Zhejiang (CN); Can You, Zhejiang (CN); Peng Xu, Zhejiang (CN)

(73) Assignee: HANGZHOU HIKVISION DIGITAL TECHNOLOGY CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 16/066,105

(22) PCT Filed: Nov. 1, 2017

(86) PCT No.: PCT/CN2017/108890
§ 371 (c)(1),
(2) Date: Jun. 26, 2018

(87) PCT Pub. No.: WO2018/090825
PCT Pub. Date: May 24, 2018

(65) Prior Publication Data
US 2019/0342503 A1    Nov. 7, 2019

(30) Foreign Application Priority Data
Nov. 15, 2017    (CN) .......................... 2016 1 1030013

(51) Int. Cl.
H04N 5/232    (2006.01)

(52) U.S. Cl.
CPC ... *H04N 5/232123* (2018.08); *H04N 5/23296* (2013.01); *H04N 5/23299* (2018.08)

(58) Field of Classification Search
CPC ......... H04N 5/232123; H04N 5/23299; H04N 5/23296
(Continued)

(56) References Cited

U.S. PATENT DOCUMENTS

| 4,794,417 A * | 12/1988 | Sekiguchi | ............... G02B 7/30 348/345 |
| 5,055,932 A | 10/1991 | Hijikata | |
| 2011/0075125 A1 | 3/2011 | Kaisha | |

FOREIGN PATENT DOCUMENTS

| CN | 101446739 | 6/2009 |
| CN | 101494737 | 7/2009 |

(Continued)

OTHER PUBLICATIONS

English Translation of International Search Report and Written Opinion from International Application No. PCT/CN2017/108890, 12 pages.
European Application No. 17871326.9; Extended European Search Report dated Jun. 25, 2019; 9 pages.
Wikipedia; Plane (geometry) dated Nov. 10, 2016; 9 pages.

*Primary Examiner* — Lin Ye
*Assistant Examiner* — Chan T Nguyen
(74) *Attorney, Agent, or Firm* — Meunier Carlin & Curfman LLC

(57) ABSTRACT

Embodiments of the present application provide an automatic focusing method and a PTZ camera. The method is applicable to the PTZ camera and comprises: calculating a current target object distance from a lens of the PTZ camera to a monitored target monitoring plane based on a pre-established spatial object distance parameter; wherein, the spatial object distance parameter contains a spatial plane equation of a reference monitoring plane; the reference monitoring plane is an equivalent plane of the target monitoring plane; searching in a preset relation table based on the current target object distance, a current magnification of the PTZ camera, determining a position information corre- (Continued)

calculating a current target object distance from a lens of the PTZ camera to a monitored target monitoring plane based on a pre-established spatial object distance model; wherein, the spatial object distance model contains a spatial plane equation of a reference monitoring plane; the reference monitoring plane is an equivalent plane of the target monitoring plane — S101 searching in a preset relation table based on the current target object distance, a current magnification of the PTZ camera, and determining a position information of a focus motor of the PTZ camera; wherein, the preset relation table includes the relationship between the target object distance, the magnification and the position information of the focus motor; — S102 driving the focus motor to a position corresponding to the determined position information — S103 sponding to a focus motor of the PTZ camera, the preset relation table including the relationship of the object distance, the magnification and the position information of the focus motor, and driving the focus motor to a position corresponding to the determined position information. Embodiments of the present application are applied to realize fast automatic focusing of the PTZ camera.

13 Claims, 4 Drawing Sheets

(58) Field of Classification Search
USPC .......................................................... 348/345
See application file for complete search history.

(56) References Cited

FOREIGN PATENT DOCUMENTS

| | | | | |
|---|---|---|---|---|
| CN | 101611625 | 12/2009 | | |
| CN | 103197491 | 7/2013 | | |
| CN | 103747179 | 4/2014 | | |
| CN | 104135614 | 11/2014 | | |
| CN | 104469168 | 3/2015 | | |
| CN | 105227835 | 1/2016 | | |
| CN | 105765964 | 7/2016 | | |
| GB | 2271442 A | 4/1994 | | |
| WO | 2013055737 A1 | 4/2013 | | |
| WO | WO2013/055737 | * | 4/2013 | ............. H04N 5/232 |

* cited by examiner

METHOD FOR AUTOMATIC FOCUS AND PTZ CAMERA

The present application claims the priority to a Chinese Patent Application No. 201611030013.9, filed with the State Intellectual Property Office of the People's Republic of China on Nov. 15, 2016 and entitled "METHOD FOR AUTOMATIC FOCUS AND PTZ CAMERA", which is incorporated herein by reference in its entirety.

TECHNICAL FIELD

The present application relates to the field of optical photography technology, and in particular to an automatic focusing method and a PTZ camera.

BACKGROUND

At present, in order to obtain a clear image when taking a photograph, a PTZ (Pan/Tilt/Zoom) camera, commonly referred to as an omni-directional camera with a cradle head, is generally required to automatically focus on an object to be photographed so that the focus of a lens of the PTZ camera falls on an image sensor. The image sensor is for example a CMOS (Complementary Metal Oxide Semiconductor) image sensor. The focus refers to a point where parallel light beams converge after refracted by a lens.

In the prior art, in order to realize automatic focusing, a PTZ camera is required to adjust the position of a focus motor in a lens for several times; then evaluate and analyze the clarity of an object to be photographed at various positions using a clarity evaluation function to obtain clarity values corresponding to the various positions; search various positions back and forth to obtain a position corresponding to the largest clarity value using a blind hill climbing search algorithm; and finally move the focus motor to this position, thus completing the automatic focusing.

However, in such an automatic focusing method, the focusing speed is slow and fast focusing cannot be achieved.

SUMMARY

The object of embodiments of the present application is to provide an automatic focusing method and a PTZ camera to achieve fast focusing.

In a first aspect, an embodiment of the present application provides an automatic focusing method applicable to an omni-directional PTZ camera with a cradle head, the method can includes:

calculating a current target object distance from a lens of the PTZ camera to a monitored target monitoring plane based on a pre-established spatial object distance parameter; wherein, the spatial object distance parameter contains a spatial plane equation of a reference monitoring plane; the reference monitoring plane is an equivalent plane of a target monitoring plane;

searching in a preset relation table based on the current target object distance, a current magnification of the PTZ camera, and determining a position information of a focus motor of the PTZ camera, wherein, the preset relation table includes the relationship between the object distance, the magnification and the position information of the focus motor when the focus of the lens of the PTZ camera falls on an image sensor of the PTZ, camera;

driving the focus motor to a position corresponding to the determined position information.

Optionally, establishing a spatial object distance parameter can include:

determining a reference monitoring plane of the PTZ camera;

determining spatial coordinates of at least three target points in the reference monitoring plane;

calculating the spatial plane equation of the reference monitoring plane based on spatial coordinates of each target point to establish the spatial object distance parameter.

Optionally, determining spatial coordinates of any target point of the three objects can include:

obtaining a distance from any target point in a spatial rectangular coordinate system to the lens of the PTZ camera, wherein, an origin of the spatial rectangular coordinate system is an intersection of rotation axes of the PTZ camera; the rotation axes of the PTZ camera include a rotation axis about which the PTZ camera rotates in a horizontal direction and a rotation axis about which the PTZ camera rotates in a vertical direction;

obtaining the position information of the lens of the PTZ camera in the spatial rectangular coordinate system;

calculating spatial coordinates of any target point based on the distance and the position information of the lens of the PTZ camera in the spatial rectangular coordinate system.

Optionally, obtaining a distance from any target point in a spatial rectangular coordinate system to the lens of the PTZ camera can include:

calculating, under a preset magnification, the position information of the focus motor when focusing on any target point using a contrast automatic focusing algorithm;

calculating a distance from any target point to the lens of the PTZ camera based on the preset magnification, the position information calculated using the contrast automatic focusing algorithm and the preset relation table.

Optionally, the spatial rectangular coordinate system includes an X-axis, a Y-axis, and a Z-axis;

the position information of the lens of the PTZ camera in the spatial rectangular coordinate system, includes:

a first angle formed between the lens of the PTZ camera and the Z-axis of the spatial rectangular coordinate system and a second angle formed between the lens of the PTZ camera and the X-axis of the spatial rectangular coordinate system.

Optionally, the step of calculating a current target object distance from the lens of the PTZ camera to a monitored target monitoring plane based on a pre-established spatial object distance parameter can include:

obtaining a spatial plane equation contained in a pre-established spatial object distance parameter;

determining a spatial rectangular coordinate system where the spatial plane equation is located;

calculating a vertical distance from the origin of the spatial rectangular coordinate system to a reference monitoring plane using spatial coordinates of the origin and the spatial plane equation, and taking the vertical distance as the current target object distance from the lens of the PTZ camera to the monitored target monitoring plane;

wherein, the origin is an intersection of rotation axes of the PTZ camera; the rotation axes of the PTZ camera include a rotation axis about which the PTZ camera rotates in a horizontal direction and a rotation axis about which the PTZ camera rotates in a vertical direction.

Optionally, the step of calculating a current target object distance from the lens of the PTZ camera to a monitored target monitoring plane based on a pre-established spatial object distance parameter can include:

obtaining a spatial plane equation contained in a pre-established spatial object distance parameter;

determining a spatial rectangular coordinate system where the spatial plane equation is located;

determining a first angle formed between the lens of the PTZ camera and the Z-axis of the spatial rectangular coordinate system and a second angle formed between the lens and the X-axis of the spatial rectangular coordinate system;

calculating a center point distance from the origin of the spatial rectangular coordinate system to the center point of a reference monitoring plane based on the first angle, the second angle and the spatial plane equation, and taking the center point distance as the current target object distance from the lens of the PTZ camera to the monitored target monitoring plane;

wherein, the center point is the intersection of a line where a target unit vector is located and the reference monitoring plane; the target unit vector is a unit vector that is originated from the origin determined based on the first angle and the second angle; the origin is the intersection of rotation axes of the PTZ camera; the rotation axes of the PTZ camera include a rotation axis about which the PTZ camera rotates in a horizontal direction and a rotation axis about which the PTZ camera rotates in a vertical direction.

In a second aspect, an embodiment of the present application further provides a PTZ camera, which can include:

an establishing module, configured for establishing a spatial object distance parameter;

a calculating module, configured for calculating a current target object distance from the lens of the PTZ camera to a monitored target monitoring plane based on a spatial object distance parameter pre-established by the establishing module; wherein, the spatial object distance parameter contains a spatial plane equation of a reference monitoring plane; the reference monitoring plane is an equivalent plane of the target monitoring plane;

a searching module, configured for searching in a preset relation table based on the current target object distance, a current magnification of the PTZ camera, and determining a position information of a focus motor of the PTZ camera, wherein, the preset relation table contains the relationship between the object distance, the magnification and the position information of the focus motor when the focus of the lens of the PTZ camera is located on an image sensor of the PTZ camera;

a driving module, configured for driving the focus motor to a position corresponding to the determined position information.

Optionally, the establishing module can include:

a first determining sub-module, configured for determining a reference monitoring plane of the PTZ camera;

a second determining sub-module, configured for determining spatial coordinates of at least three target points in the reference monitoring plane;

a first calculating sub-module, configured for calculating the spatial plane equation of the reference monitoring plane based on spatial coordinates of each target point to establish the spatial object distance parameter.

Optionally, the second determining sub-module can include:

a first obtaining unit, configured for obtaining a distance from any target point in a spatial rectangular coordinate system to the lens of the PTZ camera, wherein, an origin of the spatial rectangular coordinate system is an intersection of rotation axes of the PTZ camera; the rotation axes of the PTZ camera include a rotation axis about which the PTZ camera rotates in a horizontal direction and a rotation axis about which the PTZ camera rotates in a vertical direction;

a second obtaining unit, configured for obtaining position information of the lens of the PTZ camera in the spatial rectangular coordinate system;

a calculating unit, configured for calculating spatial coordinates of any target point based on the distance and the position information of the lens of the PTZ camera in the spatial rectangular coordinate system.

Optionally, the first obtaining unit is configured for:

calculating, under a preset magnification, the position information of the focus motor when focusing on any target point using a contrast automatic focusing algorithm;

calculating a distance from any target point to the lens of the PTZ camera based on the preset magnification, the position information calculated using the contrast automatic focusing algorithm and the preset relation table.

Optionally, the spatial rectangular coordinate system established by the establishing module includes an X-axis, a Y-axis and a Z-axis;

the position information of the lens of the PTZ camera in the spatial rectangular coordinate system, includes:

a first angle formed between the lens of the PTZ camera and the Z-axis of the spatial rectangular coordinate system established by the establishing module and a second angle formed between the lens of the PTZ camera and the X-axis of the spatial rectangular coordinate system established by the establishing module.

Optionally, in one implementation, the calculating module can include:

a first obtaining sub-module, configured for obtaining a spatial plane equation contained in a pre-established spatial object distance parameter;

a third determining sub-module, configured for determining a spatial rectangular coordinate system where the spatial plane equation is located;

a second calculating sub-module, configured for calculating a vertical distance from the origin of the spatial rectangular coordinate system to a reference monitoring plane based on spatial coordinates of the origin and the spatial plane equation, and taking the vertical distance as the current target object distance from the lens of the PTZ camera to the monitored target monitoring plane;

wherein, the origin is the intersection of rotation axes of the PTZ camera; the rotation axes of the PTZ camera include a rotation axis about which the PTZ camera rotates in a horizontal direction and a rotation axis about which the PTZ camera rotates in a vertical direction.

Optionally, in another implementation, the calculating module includes:

a second obtaining sub-module, configured for obtaining a spatial plane equation contained in a pre-established spatial object distance parameter;

a fourth determining sub-module, configured for determining a spatial rectangular coordinate system where the spatial plane equation is located;

a fifth determining sub-module, configured for determining a first angle formed between the lens of the PTZ camera and the Z-axis of the spatial rectangular coordinate system and a second angle formed between the lens and the X-axis of the spatial rectangular coordinate system;

a third calculating sub-module, configured for calculating a center point distance from the origin of the spatial rectangular coordinate system to the center point of a reference monitoring plane based on the first angle, the second angle and the spatial plane equation, and taking the center point distance as the current target object distance from the lens of the PTZ camera to the monitored target monitoring plane;

wherein, the center point is the intersection of a line where a target unit vector is located and the reference monitoring plane; the target unit vector is a unit vector that is originated from determined based on the first angle and the second angle; the origin is the intersection of rotation axes of the PTZ camera; the rotation axes of the PTZ camera include a rotation axis about which the PTZ camera rotates in a horizontal direction and a rotation axis about which the PTZ camera rotates in a vertical direction.

In a third aspect, an embodiment of the present application further provides a storage medium, which is configured to store the executable program code, the executable program code are configured for implementing the automatic focusing method provided by embodiments of the present application when being executed.

In a fourth aspect, an embodiment of the present application further provides an application program, which is configured for implementing the automatic focusing method provided by embodiments of the present application when being executed.

In embodiments of the present application, the current target object distance from the lens of a PTZ, camera at an arbitrary angle to a target monitoring plane corresponding to the arbitrary angle can be calculated based on a pre-established spatial object distance parameter, and thus the position information of a focus motor corresponding to the current target object distance and the current magnification of the PTZ camera is obtained based on a preset relation table stored in advance, and thus fast focusing is realized.

BRIEF DESCRIPTION OF THE DRAWINGS

To illustrate the technical solutions in the embodiments of the present application and the prior art more clearly, the following briefly introduces the accompanying drawings required for describing e embodiments and the prior art. It is obvious that the drawings below are only some embodiments of the present application, and those skilled in the art can also obtain other drawings based on these drawings without any creative efforts.

DETAILED DESCRIPTION

The technical solutions in the embodiments of the present application will be described clearly and completely below with reference to the accompanying drawings in the embodiments of the present application. Obviously, the described embodiments are only some of the embodiments of the present application, rather than all of the embodiments. All other embodiments obtained based on the embodiments of the present application by those skilled in the art without any creative work fall into the protection scope defined by the present application.

It can be understood by a person skilled in the art that in order to monitor a scene of a larger range, a PTZ (Pan/Tilt/Zoom) camera, commonly referred to as an omni-directional camera with a cradle head, often needs to rotate in both horizontal direction and vertical direction. However, when the PTZ camera rotates, it needs to automatically focus on an object to be photographed again to obtain a clear image.

In the prior art, in order to automatically focus on an object to be photographed again, automatic focusing is often realized by means of a series of operations and algorithms described in the background during the process of photographing. However, this automatic focusing method would cause the focusing speed slow because the operations of, such as repeatedly adjusting the position of a focus motor, clarity evaluation and analysis using a clarity evaluation function, and searching for the position of the focus motor corresponding to the maximum clarity value using a blind hill climbing search algorithm take a large amount of time.

In order to solve the above technical problems, embodiments of the present application provide an automatic focusing method and a PTZ camera.

Firstly, the automatic focusing method provided by an embodiment of the present application will be described below.

It should be noted that the executive subject that implements the automatic focusing method provided by an embodiment of the present application is a PTZ camera. In addition, the functional software for implementing the automatic focusing method provided by an embodiment of the present application can be a special automatic focusing software provided in a PTZ camera, or a functional plug-in provided in existing automatic focusing software in a PTZ camera. The PTZ camera includes but is not limited to a dome camera.

Figure 1:
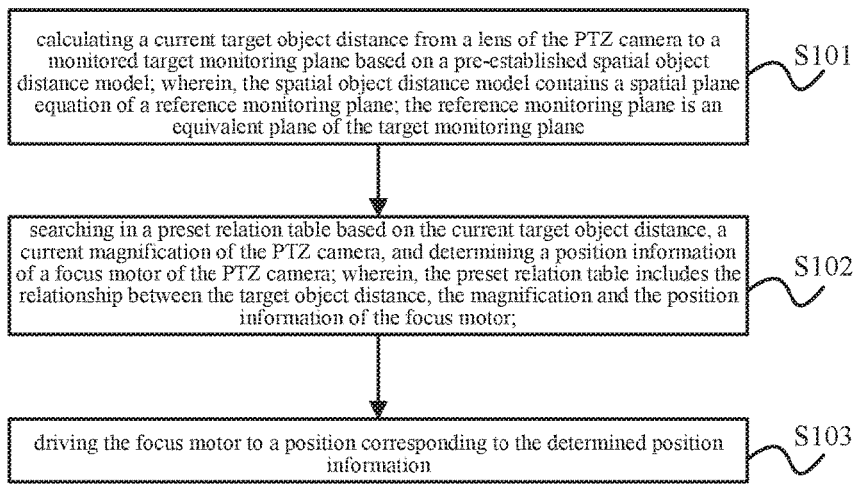
FIG. 1 is a flowchart of an automatic focusing method provided by an embodiment of the present application.

Referring to FIG. 1, the automatic focusing method provided by an embodiment of the present application can include the following steps.

S101: calculating a current target object distance from the lens of the PTZ camera to a monitored target monitoring plane based on a pre-established spatial object distance parameter; wherein, the spatial object distance parameter includes a spatial plane equation of a reference monitoring plane; the reference monitoring plane is an equivalent plane of the target monitoring plane.

It should be noted that in a specific application of a PTZ camera, when the PTZ camera rotates, i.e., when the lens of the NY camera rotates, the area monitored by the PTZ camera changes, but the areas monitored by the PTZ camera rotating to different angles are often located in the same plane. For example, a PTZ camera is used to monitor a traffic lane at a housing estate's entrance during a preset first time period. Then an area fixedly monitored by the PTZ camera during the first time period is an area where the traffic lane at the housing estate's entrance is located, and a plane formed by the photographed image of the area where the traffic lane at the housing estate's entrance is located can be taken as a target monitoring plane. The PTZ camera is used to monitor the left traffic lane at the housing estate's entrance during a preset second time period. Then an area fixedly monitored by the PTZ, camera during the second preset time period is an area where the left traffic lane at the housing estate's entrance is located, and a plane formed by the photographed image of the area where the left traffic lane at the housing estate's entrance is located can be taken as another target monitoring plane. As can be seen, all the planes formed by photographed images of the areas monitored by the camera can be taken as target monitoring planes. It can be understood that the traffic lane at the housing estate's entrance and the left traffic lane at the housing estate's entrance are often located in the same plane, or a slight angle is formed therebetween.

In addition, when the PTZ camera rotates from an angle corresponding to the monitoring of the traffic lane at the housing estate's entrance to an angle corresponding to the monitoring of the left traffic lane at the housing estate's entrance, the lens of the PTZ camera moves, and the current target object distance from the lens of the PTZ camera to the monitored target monitoring plane is very likely to be changed as well.

The plane formed by the photographed image of the area where the traffic lane at the housing estate's entrance is located can be preset as a reference monitoring plane, of course the present application is not limited to this. In this way, the spatial plane equation of a reference monitoring plane included in the spatial object distance parameter is a spatial plane equation corresponding to the plane formed by the photographed image of the area where the traffic lane at the housing estate's entrance is located. In this way, due to the traffic lane at the housing estate's entrance and the left traffic lane at the housing estate's entrance are often in the same plane or a slight angle is formed therebetween, the preset reference monitoring plane is an equivalent plane of the target monitoring plane. Thus, the current target object distance from the lens of the PTZ camera to the monitored target monitoring plane can be calculated using the spatial plane equation of the reference monitoring plane included in the spatial object distance parameter.

It can be understood that a person skilled in the art can set the slight angle based on empirical values. For example, the slight angle can be 3°, of course the present application is not limited to this.

In one implementation, a vertical distance from the lens of the PTZ camera to the monitored target monitoring plane can be calculated based on the pre-established spatial object distance parameter as the current target object distance. In this implementation, the vertical distance from the lens to the reference monitoring plane can be calculated using a calculation method for a point to a plane, of course the present application is not limited to this. The spatial object distance parameter can be understood as a spatial object distance model.

In another implementation, a center point distance from the lens of the PTZ camera to the center point of the monitored target monitoring plane can be calculated based on the pre-established spatial object distance parameter as the current target object distance. In this implementation, the center point distance from the lens to the center point of the reference monitoring plane can be calculated in conjunction with the characteristics that the center point of the target monitoring plane is located in the target monitoring plane and the reference monitoring plane is an equivalent plane of the target monitoring plane, thus the current target object distance can be obtained.

Figure 7:
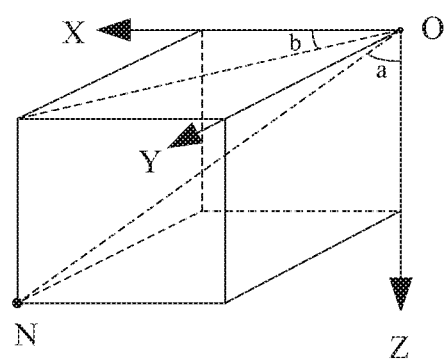
FIG. 7 is a schematic diagram of a target point N in the spatial rectangular coordinate system shown in FIG. 3.
Figure 8:
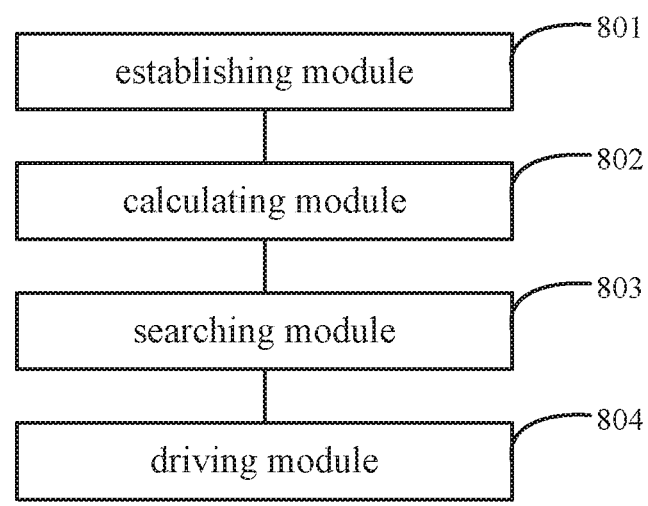
FIG. 8 is a schematic structural diagram of a PTZ camera provided by an embodiment of the present application.

For example, assume that the target monitoring plane is parallel to the XOY plane as shown in FIG. 7 and the center point of the target monitoring plane is the point N whose spatial coordinates are (x, y, z). In addition, assume that the point O in FIG. 7 is the position where the lens of the PTZ camera is located, or the point O is very close to the lens of the PTZ camera, i.e., it can be considered that the position where the point O is located is the position where the lens of the PTZ camera is located. Further, assume that the angle between the lens and the Z-axis is a first angle a and the angle between the lens and the X-axis is a second angle b. In this way, x, y and z can be represented by the center point distance $L_{ON}$ from the lens to the center point. Specifically, $x=\sin a \times \cos b \times L_{ON}$, $y=\sin a \times \sin b \times L_{ON}$ and $z=\cos a \times L_{ON}$. Then, x, y and z are substituted into the spatial plane equation included in the pre-established spatial object distance parameter to calculate the center point distance $L_{ON}$, in this case, the center point distance $L_{ON}$ is the current target object distance.

As can be seen from the above two implementations, the current target object distance from the lens of the PTZ, camera to the monitored target monitoring plane can specifically be a vertical distance from the lens of the PTZ camera to the monitored target monitoring plane, or a center point distance from the lens of the PTZ camera to the center point of the monitored target monitoring plane. The calculation of the center point distance from the lens of the PTZ camera to the center point of the monitored target monitoring plane enables the PTZ camera to focus on this center point, so that the photographed image of the target monitoring plane at other positions are clearer.

S102: searching in a preset relation table based on the current target object distance, a current magnification of the PTZ camera, and determining a position information corresponding to a focus motor of the camera, wherein, the preset relation table includes the relationship of the object distance, the magnification and the position information of the focus motor.

It can be understood by a person skilled the art that before taking a photograph formally using the PTZ, camera, it is possible to calculate, by the prior art, the relationship between the object distance, the magnification and the position information of the focus motor when a clear image is obtained, i.e., when the focus falls on an image sensor of the PTZ camera, and to store the relationship into the preset relation table of the PTZ camera.

For example, during the stage of establishing a preset relation table, the magnification of the lens of the PTZ camera is preset, and this magnification (i.e., the position of the zooming motor in the PTZ camera) is set to be constant. When obtaining a clear image, the position of a focus motor is calculated for each object distance using a clarity evaluation function and a blind hill climbing search algorithm as described in the background. The object distances are all preset, and the position information of the focus motor corresponding to each object distance is stored in the preset relation table. Then, the magnification of the lens of the PTZ, camera is modified. For this modified magnification, when obtaining a clear image, the position of a focus motor is calculated for each object distance using a clarity evaluation function and a blind hill climbing search algorithm as described in the background. The position information of the focus motor corresponding to each object distance is stored in the preset relation table to establish the preset relation table.

In order to conveniently illustrate the established preset relation table, a graph illustrating the relationship between the object distance, the magnification and the position information of a focus motor as shown in 2 can be obtained based on the preset relation table.

Figure 2:
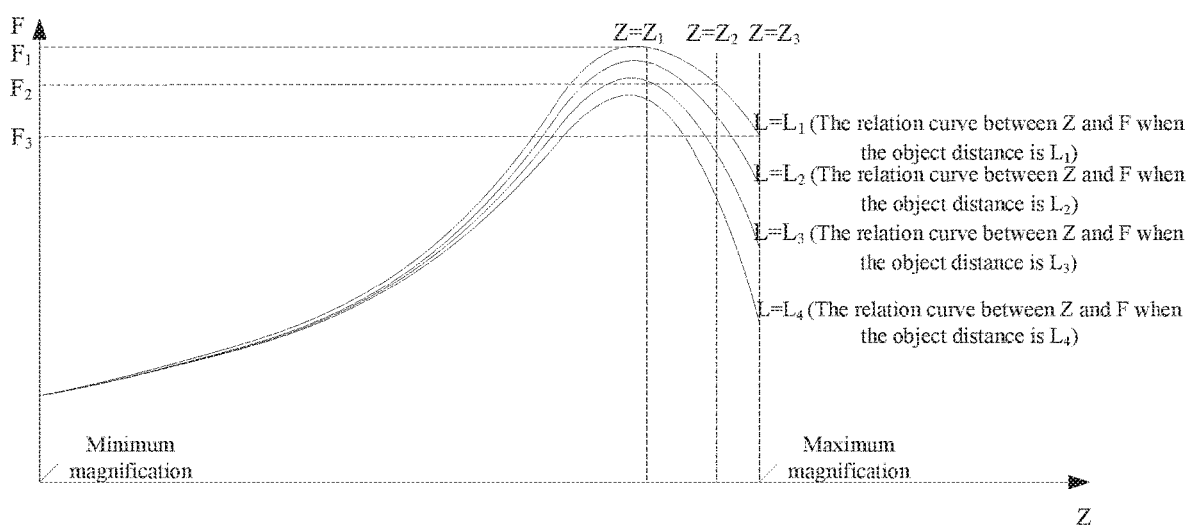
FIG. 2 is a schematic diagram of curves illustrating the relationship between the object distance, the magnification and the position information of a focus motor recorded in a preset relation table in an embodiment of the present application.

As shown in FIG. 2, the abscissa of FIG. 2 is a magnification Z, wherein the current magnification of the lens of the PTZ camera is between a maximum magnification and a minimum magnification. The ordinate is the position F of a focus motor, i.e., a position information F of a focus motor. When the object distance L equates to $L_1$, the relation curve $L=L_1$ between the magnification and the position of the focus motor is obtained, i.e., the relation curve between Z and F when the object distance is $L_1$. When the object distance L equates to $L_2$, the relation curve $L=L_2$ between the magnification and the position of the focus motor is obtained, i.e., the relation curve between Z and F when the object distance is $L_2$. When the object distance L equates to $L_3$, the relation curve $L=L_3$ between the magnification and the position of the focus motor is obtained, i.e., the relation curve between Z and F when the object distance is $L_3$.

Thus, it can be known in conjunction with FIG. 2 that when taking a photograph formally using a PTZ camera, the position information of the focus motor can be quickly obtained as $F_1$ after the current target object distance is obtained as $L_1$ and the current magnification is obtained as $Z_1$ during the process of focusing. The position information of the focus motor can be quickly obtained as $F_2$ after the current target object distance is obtained as $L_1$ and the current magnification is obtained as $Z_2$ during the process of focusing, which improves the speed for obtaining the position information of the focus motor.

It should be noted that, the current magnification of a camera refers to the ratio of the current focal length of the lens to the minimum focal length of this lens. The position indicated by this ratio is the position of the zooming motor in the PTZ camera, which is the prior art and will not be described in detail here.

The current magnification is a magnification when the PTZ, camera last finished the focusing operation or a preset initial magnification before the PTZ camera performs the focusing operation for the first time.

S103: driving the focus motor to a position corresponding to the determined position information.

The focus motor can be driven to the position corresponding to the position information as long as the position information of the focus motor is obtained, so as to realize fast focusing. That is to say, the PTZ camera can collect clear monitoring images at this time.

In embodiments of the present application, the current target object distance from the lens of a PTZ camera at an arbitrary angle to a target monitoring plane corresponding to this arbitrary angle can be calculated based on a pre-established spatial object distance parameter, and thus the position information of a focus motor corresponding to the current target object distance and the current magnification of the PTZ camera is obtained based on a preset relation table stored in advance, and thus fast focusing is realized and a clear image can be taken for the target monitoring plane corresponding to this angle.

The way of establishing a spatial object distance parameter in embodiments of the present application is described below in conjunction with FIGS. 3 to 6.

In a specific embodiment of the present application, the step of establishing a spatial object distance parameter can include:

step 1: determining a reference monitoring plane monitored by the PTZ camera.

It can be understood that, because the PTZ camera is commonly utilized to monitor a monitored area, after the PTZ camera is installed, in an embodiment, the PTZ camera can determine a plane formed by the monitored area (e.g., a traffic lane at the housing estate's entrance) when installation is completed as the reference monitoring plane.

Figure 3:
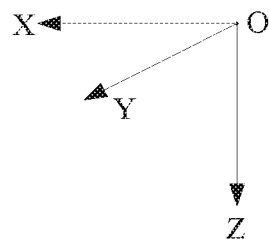
FIG. 3 is a schematic diagram of a spatial rectangular coordinate system established in an embodiment of the present application.

In addition, because the PTZ camera often rotates in horizontal direction and vertical direction, the intersection of the rotation axis about which the PTZ camera rotates in a horizontal direction and the rotation axis about which the PTZ camera rotates in a vertical direction, i.e., the intersection of rotation axes can be taken as the origin of a spatial rectangular coordinate system so as to establish the spatial rectangular coordinate system, wherein the established spatial rectangular coordinate system can be shown in FIG. 3.

Figure 4:
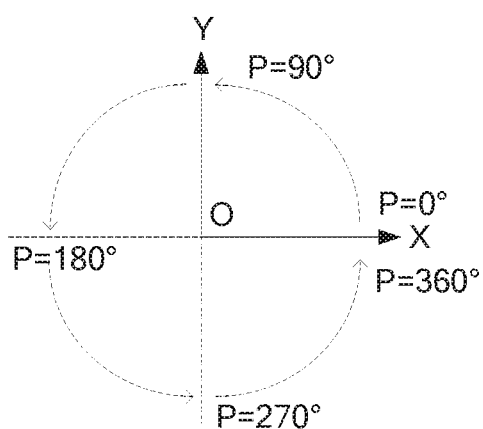
FIG. 4 is a schematic diagram of the XOY plane of the spatial rectangular coordinate system shown in FIG. 3.
Figure 5:
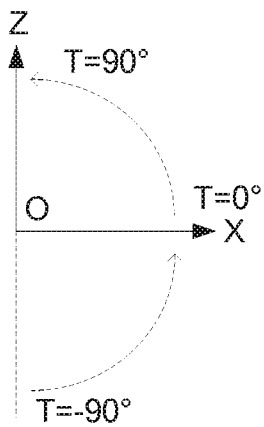
FIG. 5 is a schematic diagram of the XOZ plane of the spatial rectangular coordinate system shown in FIG. 3.

Referring to FIG. 3, in which an X-axis, a Y-axis, and a Z-axis are included, the Z-axis is set to be perpendicular to the monitored reference monitoring plane and the PTZ camera can rotate about the Z-axis in a horizontal direction. The X-axis is set to be parallel to the monitored reference monitoring plane and the PTZ camera can rotate about the X-axis in a vertical direction. The Y-axis is also set to be parallel to the monitored reference monitoring plane and the positive direction of the Y-axis is at an angle of 90 degrees with the positive direction of the X-axis. Referring to FIG. 4, the positive direction of the X-axis is set to be at a horizontal angle of P=0 degrees, then the positive direction of the Y-axis is at a horizontal angle of P=90 degrees, the negative direction of the X-axis is at a horizontal angle of P=180 degrees, and the negative direction of the Y-axis is at a horizontal angle of P=270 degrees. Then the positive direction of the X-axis is at a horizontal angle of P=0 degrees and also at a horizontal angle of P=360 degrees. Referring to FIG. 5, the positive direction of the Z-axis is set to be at a vertical angle of T=90 degrees; the negative direction of the Z-axis is set to be at a vertical angle of T=−90 degrees. The vertical angle of T=0 degrees is any direction angle perpendicular to the Z-axis and through the origin O, e.g., the positive direction of the X-axis is at a vertical angle of T=0 degrees and the positive direction of the Y-axis is also at a vertical angle of T=0 degrees.

Step 2: determining spatial coordinates of at least three target points in the reference monitoring plane.

Figure 6:
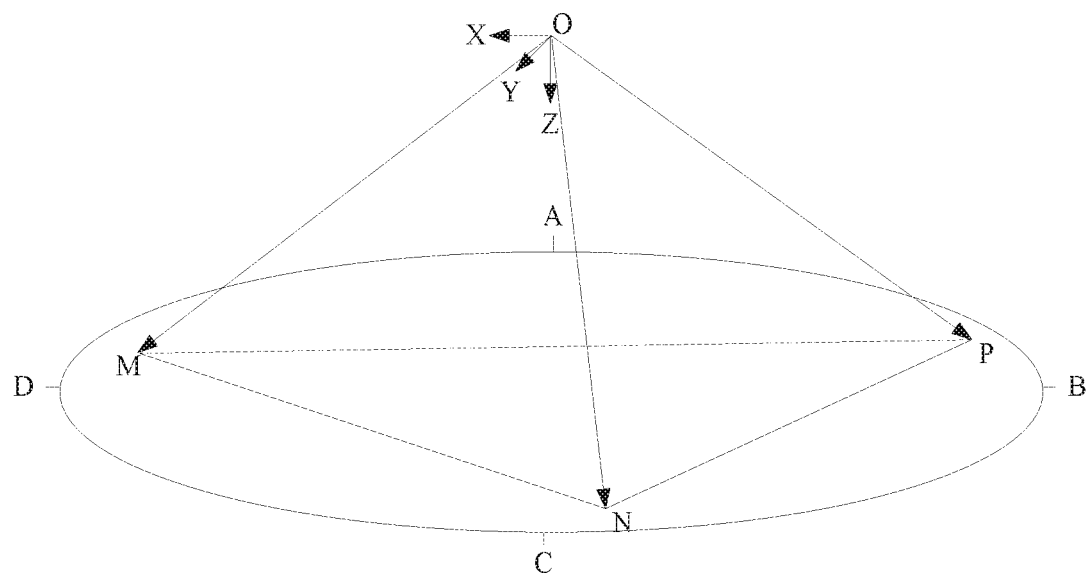
FIG. 6 is a schematic diagram of a reference monitoring plane in the spatial rectangular coordinate system shown in FIG. 3.

It can be understood that, after the spatial rectangular coordinate system is determined, spatial coordinates of at least three target points in the determined reference monitoring plane can be determined using the established spatial rectangular coordinate system. Referring to FIG. 6, a person skilled in the art marks three target points M, N and P in the reference monitoring plane ABCD in advance, and a person skilled in the art can determine spatial coordinates of the marked three target points in the established spatial rectangular coordinate system in advance and input them to the PTZ camera.

Step 3: calculating the spatial plane equation of the reference monitoring plane based on spatial coordinates of each target point to establish the spatial object distance parameter.

For example, spatial coordinates of at least three target points in the reference monitoring plane ABCD are determined as M $(x_1, y_1, z_1)$, N $(x_2, y_2, z_2)$ and P $(x_3, y_3, z_3)$ respectively after a reference monitoring plane monitored by a PTZ camera is determined, e.g., the plane where a traffic lane at a housing estate's entrance is located is determined as the reference monitoring plane ABCD. A general spatial plane equation can be obtained after calculation and transformation by substituting spatial coordinates of at least three target points into a point normal form equation: $A(x)+B(y)+C(z)+D=0$. That is to say, the values of A, B, C and D can be calculated, and then this general spatial plane equation can be used as the spatial plane equation of the reference monitoring plane. This is a commonly used mathematical calculation method and its specific calculation process is not described here in detail.

In addition, it can be known from the mathematical knowledge that when the spatial plane equation needs to be calculated through spatial coordinates of three target points, the three target points are not on the same straight line, that is, the three target points marked by those skilled in the art are not on the same straight line.

Of course, spatial coordinates of three target points marked in the reference monitoring plane can be obtained through calculation. The step of calculating spatial coordinates of any one of the three target points can include:

obtaining a distance from any target point in a spatial rectangular coordinate system to the lens of the PTZ camera, wherein, the origin of the spatial rectangular coordinate system is an intersection of rotation axes of the PTZ camera; the rotation axes of the PTZ camera include a rotation axis about which the PTZ camera rotates in a horizontal direction and a rotation axis about which the PTZ camera rotates in a vertical direction;

obtaining a position information of the lens of the PTZ camera in the spatial rectangular coordinate system;

calculating spatial coordinates of any target point based on the distance and the position information of the lens of the PTZ camera in the spatial rectangular coordinate system.

It can be understood that when it is needed to calculate the spatial coordinates of any target point of the three target points, it is necessary to first obtain the distance from the any target point to the lens of the PTZ camera. It is possible to search for the distance from any target point to the lens of the PTZ camera in the preset relation table based on the current magnification of the PTZ camera and the position information of the focus motor when a clear image can be obtained for this target point. In one implementation, the position information of the focus motor when focusing on the current target point can be calculated under a preset magnification using a contrast automatic focusing algorithm. This calculation method is available in the prior art and its specific calculation process is not described here in detail.

Moreover, the PTZ camera often rotates according to rotation rules set by a technician, for example, the PTZ camera rotates to a first target position according to rotation rules during a first time period, and rotates to a second target position according to rotation rules during a second time period. Thus, the position information of the lens of the PTZ camera in a pre-established spatial rectangular coordinate system can be obtained based on preset rotation rules.

The obtained position information of the lens of the PTZ camera can be a coordinate information of the lens of the PTZ, camera in the established spatial rectangular coordinate system; or a first angle formed between the lens of the PTZ camera and the Z-axis of the spatial rectangular coordinate system and a second angle formed between the lens of the PTZ camera and the X-axis of the spatial rectangular coordinate system.

When the coordinate information of the lens is obtained, spatial coordinates of this target point can be calculated using a calculation formula for calculating a distance between two points under the principle that the distance from the lens to this target point equals to the distance from this target point to the lens of the PTZ camera found in the preset relation table.

When the first angle formed between the lens and the Z-axis of the spatial rectangular coordinate system and the second angle formed between the lens and the X-axis of the spatial rectangular coordinate system are obtained, referring to FIG. 7, spatial coordinates of the current target point can be calculated. As shown in FIG. 7, assuming that the any target point is point N $(x_2, y_2, z_2)$, the first angle a formed by the line segment $L_{ON}$ from the target point N to the origin O and the Z-axis and the second angle b formed by the line segment $L_{ON}$ and the X-axis are obtained. Then the following can be obtained: $z_2 = \cos a \times L_{ON}$, $x_2 = \sin a \times \cos b \times L_{ON}$, $y_2 = \sin a \times \sin b \times L_{ON}$, and spatial coordinates of this target point N are obtained as N $(x_2, y_2, z_2)$.

Corresponding to the above method embodiment, an embodiment of the present application further provides a PTZ camera, which can include:

an establishing module 801, configured for establishing a spatial object distance parameter;

a calculating module 802, configured for calculating a current target object distance from the lens of the PTZ camera to a monitored target monitoring plane based on the spatial object distance parameter pre-established by the establishing module 801; wherein, the spatial object distance parameter includes a spatial plane equation of a reference monitoring plane; the reference monitoring plane is an equivalent plane of the target monitoring plane;

a searching module 803, configured for searching in a preset relation table based on the current target object distance, a current magnification of the PTZ camera, and determining a position information of a focus motor of the PTZ camera, wherein, the preset relation table records the correspondence between the object distance, the magnification and the position information of the focus motor when the focus of the lens of the PTZ camera falls on an image sensor of the PTZ camera;

a driving module 804, configured for driving the focus motor to a position corresponding to the determined position information.

In embodiments of the present application, the current target object distance from the lens of a PTZ camera at an arbitrary angle to a target monitoring plane can be calculated based on a pre-established spatial object distance parameter, and thus the position information of a focus motor corresponding to the current target object distance and the current magnification of the PTZ camera is obtained based on a preset relation table stored in advance, and thus fast focusing is realized.

Optionally, the establishing module 801 can include:

a first determining sub-module, configured for determining a reference monitoring plane of the PTZ camera;

a second determining sub-module, configured for determining spatial coordinates of at least three target points in the reference monitoring plane;

a first calculating sub-module, configured for calculating the spatial plane equation of the reference monitoring plane based on spatial coordinates of each target point to establish the spatial object distance parameter.

Optionally, the second determining sub-module includes:

a first obtaining unit, configured for obtaining a distance from any target point in a spatial rectangular coordinate system to the lens of the PTZ camera, wherein, an origin of the spatial rectangular coordinate system is an intersection of rotation axes of the PTZ camera; the rotation axes of the PTZ camera include a rotation axis about which the PTZ camera rotates in a horizontal direction and a rotation axis about which the PTZ camera rotates in a vertical direction;

a second obtaining unit, configured for obtaining a position information of the lens of the PTZ camera in the spatial rectangular coordinate system;

a calculating unit, configured for calculating spatial coordinates of any target point based on the distance and the position information of the lens of the PTZ camera in the spatial rectangular coordinate system.

Optionally, the first obtaining unit is configured for:

calculating, under a preset magnification, the position information of the focus motor when focusing on any target point using a contrast automatic focusing algorithm;

calculating a distance from any target point to the lens of the PTZ camera based on the preset magnification, the position information calculated using the contrast automatic focusing algorithm and the preset relation table.

Optionally, the spatial rectangular coordinate system established by the establishing module 801 includes an X-axis, a Y-axis and a Z-axis.

The position information of the lens of the PTZ camera in the spatial rectangular coordinate system includes:

a first angle formed between the lens of the PTZ camera and the Z-axis of the spatial rectangular coordinate system established by the establishing module 801 and a second angle formed between the lens of the PTZ camera and the X-axis of the spatial rectangular coordinate system established by the establishing module 801.

Optionally, in one implementation, the calculating module can include:

a first obtaining sub-module, configured for obtaining a spatial plane equation contained in a pre-established spatial object distance parameter;

a third determining sub-module, configured for determining a spatial rectangular coordinate system where the spatial plane equation is located;

a second calculating sub-module, configured for calculating a vertical distance from the origin of the spatial rectangular coordinate system to a reference monitoring plane based on spatial coordinates of the origin and the spatial plane equation, and taking the vertical distance as the current target object distance from the lens of the PTZ camera to the monitored target monitoring plane.

The origin is an intersection of rotation axes of the PTZ camera; the rotation axes of the PTZ camera include a rotation axis about which the PTZ camera rotates in a horizontal direction and a rotation axis about which the PTZ camera rotates in a vertical direction.

Optionally, in another implementation, the calculating module can include:

a second obtaining sub-module, configured for obtaining a spatial plane equation contained in a pre-established spatial object distance parameter;

a fourth determining sub-module, configured for determining a spatial rectangular coordinate system here the spatial plane equation is located;

a fifth determining sub-module, configured for determining a first angle formed between the lens of the PTZ camera and the Z-axis of the spatial rectangular coordinate system and a second angle formed between the lens and the X-axis of the spatial rectangular coordinate system;

a third calculating sub-module, configured for calculating a center point distance from the origin of the spatial rectangular coordinate system to the center point of a reference monitoring plane based on the first angle, the second angle and the spatial plane equation, and taking the center point distance as the current target object distance from the lens of the PTZ camera to the monitored target monitoring plane.

The center point is the intersection of a line where a target unit vector is located and the reference monitoring plane. The target unit vector is a unit vector that is originated from determined based on the first angle and the second angle. The origin is the intersection of rotation axes of the PTZ camera. The rotation axes of the PTZ camera include a rotation axis about which the PTZ camera rotates in a horizontal direction and a rotation axis about which the PTZ camera rotates in a vertical direction.

Corresponding to the above method embodiment, an embodiment of the present application further provide a storage medium for storing executable program code, the executable program code are configured for implementing the automatic focusing method provided by embodiments of the present application when being executed; specifically, the automatic focusing method can include the following steps:

calculating a current target object distance from the lens of a PTZ camera to a monitored target monitoring plane based on a pre-established spatial object distance parameter; wherein, the spatial object distance parameter includes a spatial plane equation of a reference monitoring plane; the reference monitoring plane is an equivalent plane of the target monitoring plane;

searching in a preset relation table based on the current target object distance, a current magnification of the PTZ camera, and determining a position information of a focus motor of the PTZ camera, wherein, the preset relation table includes the relationship between the object distance, the magnification and the position information of the focus motor when the focus of the lens of the PTZ camera falls on an image sensor of the PTZ camera;

driving the focus motor to a position corresponding to the determined position information.

Optionally, establishing a spatial object distance parameter can include:

determining a reference monitoring plane of the PTZ camera;

determining spatial coordinates of at least three target points in the reference monitoring plane;

calculating the spatial plane equation of the reference monitoring plane based on spatial coordinates of each target point to establish the spatial object distance parameter.

Optionally, determining spatial coordinates of any target point of the three target points can include:

obtaining a distance from any target point in a spatial rectangular coordinate system to the lens of the PTZ camera, wherein, the origin of the spatial rectangular coordinate system is an intersection of rotation axes of the PTZ camera; the rotation axes of the PTZ camera include a rotation axis about which the PTZ camera rotates in a horizontal direction and a rotation axis about which the PTZ camera rotates in a vertical direction;

obtaining a position information of the lens of the PTZ camera in the spatial rectangular coordinate system;

calculating spatial coordinates of any target point based on the distance and the position information of the lens of the PTZ camera in the spatial rectangular coordinate system.

Optionally, obtaining the distance from any target point in a spatial rectangular coordinate system to the lens of the PTZ, camera can include:

calculating, under a preset magnification, the position information of the focus motor when focusing on the current target point using a contrast automatic focusing algorithm;

calculating a distance from any target point to the lens of the PTZ camera based on the preset magnification, the position information calculated using the contrast automatic focusing algorithm and the preset relation table.

Optionally, the spatial rectangular coordinate system includes an X-axis, a Y-axis, and a Z-axis.

The position information of the lens of the PTZ camera in the spatial rectangular coordinate system includes:

a first angle formed between the lens of the PTZ camera and the Z-axis of the spatial rectangular coordinate system and a second angle formed between the lens of the PTZ camera and the X-axis of the spatial rectangular coordinate system.

Optionally, the step of calculating a current target object distance from the lens of the PTZ camera to a monitored target monitoring plane based on a pre-established spatial object distance parameter can include:

obtaining a spatial plane equation included a pre-established spatial object distance parameter;

determining a spatial rectangular coordinate system where the spatial plane equation is located;

calculating a vertical distance from the origin of the spatial rectangular coordinate system to a reference monitoring plane based on spatial coordinates of the origin and the spatial plane equation, and taking the vertical distance as a current target object distance from the lens of the PTZ camera to the monitored target monitoring plane.

The origin is an intersection of rotation axes of the PTZ camera; the rotation axes of the PTZ camera include a rotation axis about which the PTZ, camera rotates in a horizontal direction and a rotation axis about which the PTZ, camera rotates in a vertical direction.

Optionally, the step of calculating a current target object distance from the lens of the PTZ, camera to a monitored target monitoring plane based on a pre-established spatial object distance parameter can include:

obtaining a spatial plane equation included in a pre-established spatial object distance parameter;

determining a spatial rectangular coordinate system where the spatial plane equation is located;

determining a first angle formed between the lens of the PTZ camera and the Z-axis of the spatial rectangular coordinate system and a second angle formed between the lens and the X-axis of the spatial rectangular coordinate system;

calculating a center point distance from the origin of the spatial rectangular coordinate system to the center point of a reference monitoring plane based on the first angle, the second angle and the spatial plane equation, and taking the center point distance as the current target object distance from the lens of the PTZ camera to the monitored target monitoring plane.

The center point is an intersection of a line where a target unit vector is located and the reference monitoring plane. The target unit vector is a unit vector that is originated from determined based on the first angle and the second angle. The origin is the intersection of rotation axes of the PTZ camera. The rotation axes of the PTZ camera include a rotation axis about which the PTZ camera rotates in a horizontal direction and a rotation axis about which the PTZ camera rotates in a vertical direction.

In embodiments of the present application, the current target object distance from the lens of a PTZ camera at an arbitrary angle to a target monitoring plane corresponding to this arbitrary angle can be calculated based on a pre-established spatial object distance parameter, and thus the position information of a focus motor corresponding to the current target object distance and the current magnification of the PTZ camera is obtained based on a preset relation table stored in advance, and thus fast focusing is realized and a clear image can be taken for the target monitoring plane corresponding to this angle.

Corresponding to the above method embodiment, an embodiment of the present application further provide an application program, the application program is configured for implementing the automatic focusing method provided by embodiments of the present application when being executed; specifically, the automatic focusing method can include the following steps:

calculating a current target object distance from the lens of a PTZ camera to a monitored target monitoring plane based on a pre-established spatial object distance parameter; wherein, the spatial object distance parameter includes a spatial plane equation of a reference monitoring plane; the reference monitoring plane is an equivalent plane of the target monitoring plane;

searching in a preset relation table based on the current target object distance, a current magnification of the PTZ camera, determining a position information of a focus motor of the PTZ camera and driving the focus motor to a position corresponding to the position information.

The preset relation table includes the relationship between the object distance, the magnification and the position information of the focus motor.

Optionally, establishing a spatial object distance parameter can include:

determining a reference monitoring plane of the PTZ camera;

determining spatial coordinates of at least three target points in the reference monitoring plane;

calculating the spatial plane equation of the reference monitoring plane based on spatial coordinates of each target point to establish the spatial object distance parameter, Optionally, determining spatial coordinates of any target point of the three target points can include:

obtaining a distance from any target point in a spatial rectangular coordinate system to the lens of the PTZ camera, wherein, an origin of the spatial rectangular coordinate system is an intersection of rotation axes of the PTZ camera; the rotation axes of the PTZ camera include a rotation axis about which the PTZ camera rotates in a horizontal direction and a rotation axis about which the PTZ camera rotates in a vertical direction;

obtaining a position information of the lens of the PTZ camera in the spatial rectangular coordinate system;

calculating spatial coordinates of any target point based on the distance and the position information of the lens of the PTZ camera in the spatial rectangular coordinate system.

Optionally, obtaining a distance from any target point in a spatial rectangular coordinate system to the lens of the PTZ camera can include:

calculating, under a preset magnification, the position information of the focus motor when focusing on any target point using a contrast automatic focusing algorithm;

calculating a distance from any target point to the lens of the PTZ camera based on the preset magnification, the position information calculated using the contrast automatic focusing algorithm and the preset relation table.

Optionally, the spatial rectangular coordinate system includes an X-axis, a Y-axis, and a Z-axis;

The position information of the lens of the PTZ, camera in the spatial rectangular coordinate system, includes:

a first angle formed between the lens of the PTZ camera and the Z-axis of the spatial rectangular coordinate system and a second angle formed between the lens of the PTZ, camera and the X-axis of the spatial rectangular coordinate system.

Optionally, the step of calculating a current target object distance from the lens of the PTZ camera to a monitored target monitoring plane based on a pre-established spatial object distance parameter includes:

obtaining a spatial plane equation included in a pre-established spatial object distance parameter;

determining a spatial rectangular coordinate system where the spatial plane equation is located;

calculating a vertical distance from the origin of the spatial rectangular coordinate system to a reference monitoring plane based on spatial coordinates of the origin and the spatial plane equation, and taking the vertical distance as a current target object distance from the lens of the PTZ camera to the monitored target monitoring plane.

The origin is the intersection of rotation axes of the PTZ camera; the rotation axes of the PTZ camera include a rotation axis about which the PTZ camera rotates in a horizontal direction and a rotation axis about which the PTZ camera rotates in a vertical direction.

Optionally, the step of calculating a current target object distance from the lens of the PTZ camera to a monitored target monitoring plane based on a pre-established spatial object distance parameter includes:

obtaining a spatial plane equation included a pre-established spatial object distance parameter;

determining a spatial rectangular coordinate system where the spatial plane equation is located;

determining a first angle formed between the lens of the PTZ, camera and the Z-axis of the spatial rectangular coordinate system and a second angle formed between the lens and the X-axis of the spatial rectangular coordinate system;

calculating a center point distance from the origin of the spatial rectangular coordinate system to the center point of a reference monitoring plane based on the first angle, the second angle and the spatial plane equation, and taking the center point distance as the current target object distance from the lens of the PTZ, camera to the monitored target monitoring plane.

The center point is the intersection of a line where a target unit vector is located and the reference monitoring plane. The target unit vector is a unit vector that is originated from determined based on the first angle and the second angle. The origin is the intersection of rotation axes of the PTZ camera. The rotation axes of the PTZ camera include a rotation axis about which the PTZ, camera rotates in a horizontal direction and a rotation axis about which the PTZ camera rotates in a vertical direction.

In embodiments of the present application, the current target object distance from the lens of a PTZ camera at an arbitrary angle to a target monitoring plane corresponding to this arbitrary angle can be calculated based on a pre-established spatial object distance parameter, and thus the position information of a focus motor corresponding to the current target object distance and the current magnification of the PTZ camera is obtained based on a preset relation table stored in advance, and thus fast focusing is realized and a clear image can be taken for the target monitoring plane corresponding to this angle.

It should be noted that, embodiments of a PTZ camera or an application program as well as a storage medium are simply described since they are essentially similar to the embodiment of a method, and for the related parts, reference could made to the parts of the description of the embodiment of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "comprise", "include" or any variants thereof are intended to cover a non-exclusive inclusion, such that processes, methods, articles or devices including a series of elements include not only those elements listed, but also other elements not specifically listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

All embodiments in the description are described in a correlated manner, and identical or similar parts in various embodiments can be referred to one another, the description for each embodiment all focuses on the differences with other embodiments. Especially, the embodiment of a system are briefly described and reference can be made to the description of the embodiment of a method for its related contents since the embodiment of the device are substantially similar to that of the method. The embodiment of a system or a device are briefly described and reference can be made to the description of the embodiment of a method for its related contents since the embodiment of the device are substantially similar to that of the method.

The embodiments described above are just preferable embodiments of the present application, and not indented to limit the protection scope of the present application. Any modifications, alternatives, improvements or the like within the spirit and principle of the present application shall be included in the protection scope of the present application.

The invention claimed is:

1. An automatic focusing method applicable to a PTZ camera, the method comprises:

calculating a current target object distance from a lens of the PTZ camera to a monitored target monitoring plane based on a pre-established spatial object distance parameter; wherein the spatial object distance parameter contains a spatial plane equation of a reference monitoring plane; the reference monitoring plane is used as an equivalent plane of the target monitoring plane;

searching in a preset relation table based on the current target object distance, a current magnification of the PTZ camera, determining a position information corresponding to a focus motor of the PTZ camera and driving the focus motor to a position corresponding to the position information;

wherein, the preset relation table comprises the relationship between the target object distance, the magnification and the position information of the focus motor;

wherein calculating a current target object distance from the lens of the PTZ camera to a monitored target monitoring plane based on a pre-established spatial object distance parameter, comprises:

obtaining a spatial plane equation contained in the pre-established spatial object distance parameter;

determining a spatial rectangular coordinate system where the spatial plane equation is located;

determining a first angle formed between the lens of the PTZ camera and a Z-axis of the spatial rectangular coordinate system, and a second angle formed between the lens and an X-axis of the spatial rectangular coordinate system;

calculating a center point distance from the origin of the spatial rectangular coordinate system to the center point of the reference monitoring plane based on the first angle, the second angle and the spatial plane equation, and taking the center point distance as the current target object distance from the lens of the PTZ camera to the monitored target monitoring plane;

wherein the center point is the intersection of a line where a target unit vector is located and the reference monitoring plane; the target unit vector is a unit vector that is originated from the origin and determined based on the first angle and the second angle; the origin is the intersection of rotation axes of the PTZ camera; the rotation axes of the PTZ camera comprise a rotation axis about which the PTZ camera rotates in a horizontal direction and a rotation axis about which the PTZ camera rotates in a vertical direction.

2. The method of claim 1, wherein establishing a spatial object distance parameter comprises:
   determining the reference monitoring plane of the PTZ camera;
   determining spatial coordinates of at least three target points in the reference monitoring plane;
   calculating the spatial plane equation of the reference monitoring plane based on spatial coordinates of each target point to establish the spatial object distance parameter.

3. The method of claim 2, wherein determining spatial coordinates of any target point of the three target points comprises:
   obtaining a distance from any target point in a spatial rectangular coordinate system to the lens of the PTZ camera, wherein an origin of the spatial rectangular coordinate system is an intersection of rotation axes of the PTZ camera; the rotation axes of the PTZ camera comprise a rotation axis about which the PTZ camera rotates in a horizontal direction and a rotation axis about which the PTZ camera rotates in a vertical direction;
   obtaining a position information of the lens of the PTZ camera in the spatial rectangular coordinate system;
   calculating the spatial coordinates of any target point based on the distance and the position information of the lens of the PTZ camera in the spatial rectangular coordinate system.

4. The method of claim 3, wherein obtaining a distance from any target point in a spatial rectangular coordinate system to the lens of the PTZ camera comprises:
   calculating, under a preset magnification, position information of the focus motor when focusing on any target point using a contrast automatic focusing algorithm;
   calculating the distance from any target point to the lens of the PTZ camera based on the preset magnification, the position information calculated using the contrast automatic focusing algorithm and the preset relation table.

5. The method of claim 3, wherein, the spatial rectangular coordinate system comprises an X-axis, a Y-axis, and a Z-axis;
   the position information of the lens of the PTZ camera in the spatial rectangular coordinate system comprises:
   a first angle formed between the lens of the PTZ camera and the Z-axis of the spatial rectangular coordinate system, and a second angle formed between the lens of the PTZ camera and the X-axis of the spatial rectangular coordinate system.

6. The method of claim 1, wherein calculating a current target object distance from the lens of the PTZ camera to a monitored target monitoring plane based on a pre-established spatial object distance parameter comprises:
   obtaining a spatial plane equation contained in the pre-established spatial object distance parameter;
   determining a spatial rectangular coordinate system where the spatial plane equation is located;

calculating a vertical distance from the origin of the spatial rectangular coordinate system to the reference monitoring plane based on the spatial coordinates of the origin and the spatial plane equation, and taking the vertical distance as the current target object distance from the lens of the PTZ camera to the monitored target monitoring plane;
   wherein the origin is the intersection of rotation axes of the PTZ camera; the rotation axes of the PTZ camera comprise a rotation axis about which the PTZ camera rotates in a horizontal direction and a rotation axis about which the PTZ camera rotates in a vertical direction.

7. A non-transitory storage medium, wherein the storage medium is configured for storing a executable program code, the executable program code is configured for implementing the automatic focusing method of claim 1 when being executed.

8. A PTZ camera, comprising:
   an establishing module, configured for establishing a spatial object distance parameter;
   a calculating module, configured for calculating a current target object distance from a lens of the PTZ camera to a monitored target monitoring plane based on the spatial object distance parameter pre-established by the establishing module; wherein the spatial object distance parameter contains a spatial plane equation of a reference monitoring plane; the reference monitoring plane is an equivalent plane of the target monitoring plane;
   a searching module, configured for searching in a preset relation table based on the current target object distance, a current magnification of the PTZ camera, and determining a position information corresponding to a focus motor of the PTZ camera;
   a driving module, configured for driving the focus motor to a position corresponding to the position information;
   wherein the preset relation table comprises the relationship between the target object distance, the magnification and the position information of the focus motor;
   wherein the calculating module comprises:
   a second obtaining sub-module, configured for obtaining a spatial plane equation contained in a pre-established spatial object distance parameter;
   a fourth determining sub-module, configured for determining a spatial rectangular coordinate system where the spatial plane equation is located;
   a fifth determining sub-module, configured for determining a first angle formed between the lens of the PTZ camera and a Z-axis of the spatial rectangular coordinate system and a second angle formed between the lens and an X-axis of the spatial rectangular coordinate system;
   a third calculating sub-module, configured for calculating a center point distance from the origin of the spatial rectangular coordinate system to the center point of the reference monitoring plane based on the first angle, the second angle and the spatial plane equation, and taking the center point distance as the current target object distance from the lens of the PTZ camera to the monitored target monitoring plane;
   wherein the center point is the intersection of a line where a target unit vector is located and the reference monitoring plane; the target unit vector is a unit vector that is originated from the origin and determined based on the first angle and the second angle; the origin is the intersection of rotation axes of the PTZ camera; the rotation axes of the PTZ camera comprise a rotation axis about which the PTZ camera rotates in a horizontal direction and a rotation axis about which the PTZ camera rotates in a vertical direction.

9. The PTZ camera of claim 8, wherein the establishing module comprises:
   a first determining sub-module, configured for determining a reference monitoring plane of the PTZ camera;
   a second determining sub-module, configured for determining spatial coordinates of at least three target points in the reference monitoring plane;
   a first calculating sub-module, configured for calculating the spatial plane equation of the reference monitoring plane based on spatial coordinates of each target point to establish the spatial object distance parameter.

10. The PTZ camera of claim 9, wherein the second determining sub-module comprises:
    a first obtaining unit, configured for obtaining a distance from any target point in a spatial rectangular coordinate system to the lens of the PTZ camera, wherein an origin of the spatial rectangular coordinate system is an intersection of rotation axes of the PTZ camera; the rotation axes of the PTZ camera comprise a rotation axis about which the PTZ camera rotates in a horizontal direction and a rotation axis about which the PTZ camera rotates in a vertical direction;
    a second obtaining unit, configured for obtaining a position information of the lens of the PTZ camera in the spatial rectangular coordinate system;
    a calculating unit, configured for calculating the spatial coordinates of any target point based on the distance and the position information of the lens of the PTZ camera in the spatial rectangular coordinate system.

11. The PTZ camera of claim 10, wherein the first obtaining unit is configured for:
    calculating, under a preset magnification, the position information of the focus motor when focusing on any target point using a contrast automatic focusing algorithm;
    calculating a distance from any target point to the lens of the PTZ camera based on the preset magnification, the position information calculated using the contrast automatic focusing algorithm and the preset relation table.

12. The PTZ camera of claim 10, wherein the spatial rectangular coordinate system established by the establishing module comprises an X-axis, a Y-axis and a Z-axis;
    the position information of the lens of the PTZ camera in the spatial rectangular coordinate system, comprises:
    a first angle formed between the lens of the PTZ camera and the Z-axis of the spatial rectangular coordinate system established by the establishing module, and a second angle formed between the lens of the PTZ camera and the X-axis of the spatial rectangular coordinate system established by the establishing module.

13. The PTZ camera of claim 8, wherein the calculating module comprises:
    a first obtaining sub-module, configured for obtaining a spatial plane equation contained in a pre-established spatial object distance parameter;
    a third determining sub-module, configured for determining a spatial rectangular coordinate system where the spatial plane equation is located;
    a second calculating sub-module, configured for calculating a vertical distance from the origin of the spatial rectangular coordinate system to the reference monitoring plane based on the spatial coordinates of the origin and the spatial plane equation, and taking the vertical distance as the current target object distance from the lens of the PTZ camera to the monitored target monitoring plane;
    wherein an origin is an intersection of rotation axes of the PTZ camera; the rotation axes of the PTZ camera comprise a rotation axis about which the PTZ camera rotates in a horizontal direction and a rotation axis about which the PTZ camera rotates in a vertical direction.

* * * * *

UNITED STATES PATENT AND TRADEMARK OFFICE
CERTIFICATE OF CORRECTION

PATENT NO. : 10,652,452 B2
APPLICATION NO. : 16/066105
DATED : May 12, 2020
INVENTOR(S) : Qi Gong et al.

Page 1 of 1

It is certified that error appears in the above-identified patent and that said Letters Patent is hereby corrected as shown below:

On the Title Page

Item (30), Foreign Application Priority Data, please delete "November 15, 2017", and insert --November 15, 2016--.

Signed and Sealed this
Thirtieth Day of June, 2020

Andrei Iancu
*Director of the United States Patent and Trademark Office*